United States Patent
Hartmann

[11] 3,908,230
[45] Sept. 30, 1975

[54] PROCESS AND APPARATUS FOR FILLETING FISH

[75] Inventor: Franz Hartmann, Bad Oldesloe, Germany

[73] Assignee: Nordischer Maschinenbau Rud. Baader, Lubeck, Germany

[22] Filed: Apr. 1, 1974

[21] Appl. No.: 457,086

[30] Foreign Application Priority Data
Apr. 4, 1973    Germany............................ 2316791

[52] U.S. Cl. .............................. 17/57; 17/54; 17/45; 17/46; 17/52
[51] Int. Cl.² ....................................... A22C 25/16
[58] Field of Search ............... 17/54, 56, 57, 52, 45, 17/46

[56] References Cited
UNITED STATES PATENTS
2,893,052   7/1959   Schlichting ............................ 17/56
3,525,120   8/1970   Jobmann ................................ 17/57

Primary Examiner—Louis G. Mancene
Assistant Examiner—James D. Hamilton
Attorney, Agent, or Firm—Edward F. Levy

[57] ABSTRACT

A method and apparatus for filleting fish is disclosed. Cuts are made into the flesh of the fish between the root of the tail and the belly cavity by a pair of belly knives. The belly spines so revealed are used to guide the fish and the presence or absence of these bones is used to control the operation of a pair of belly knives. Specifically, this is done by a sensor which senses the presence or absence of the belly spines and which is linked, for example by electronic means, to a pair of belly flaps adjacent the rib knives.

7 Claims, 8 Drawing Figures

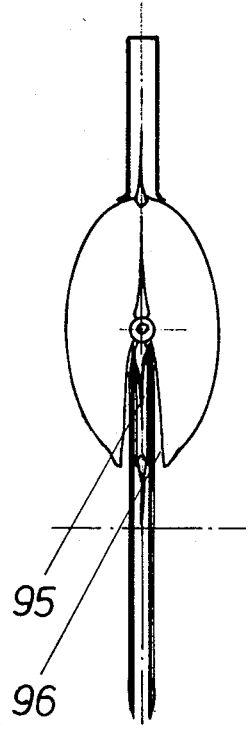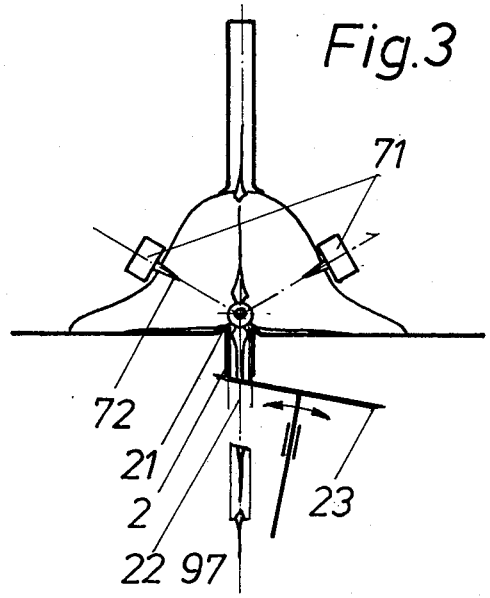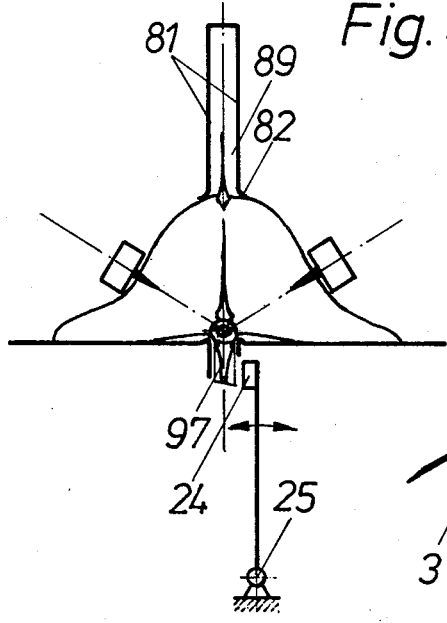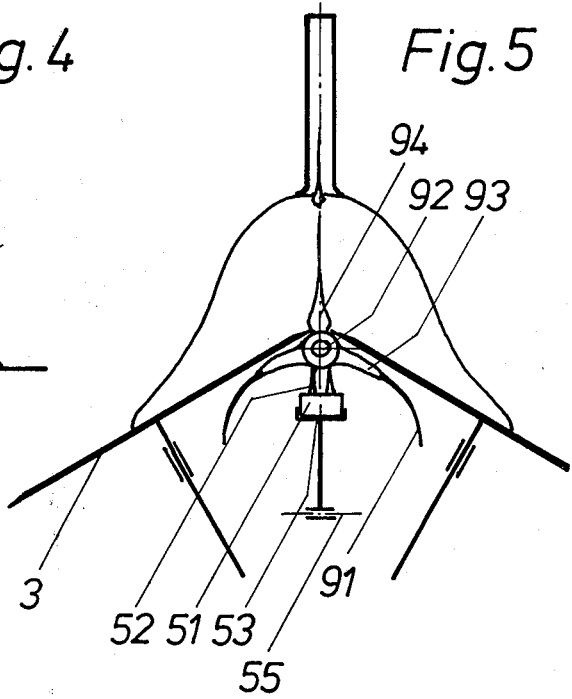

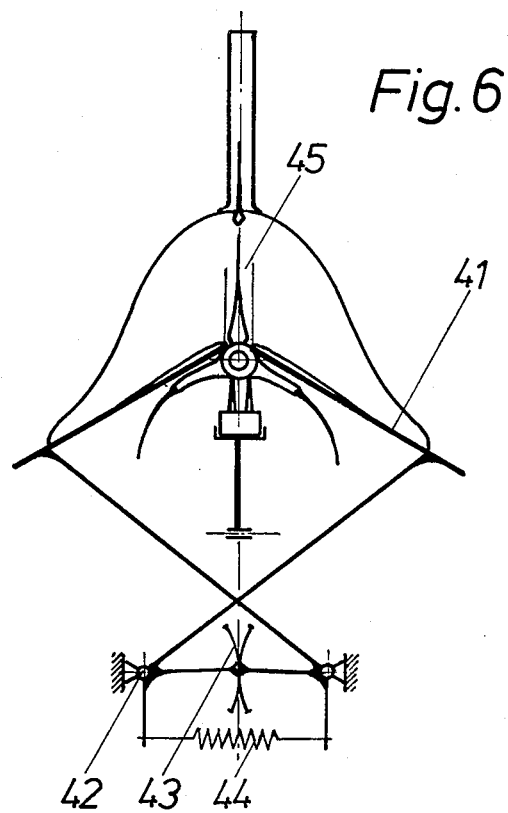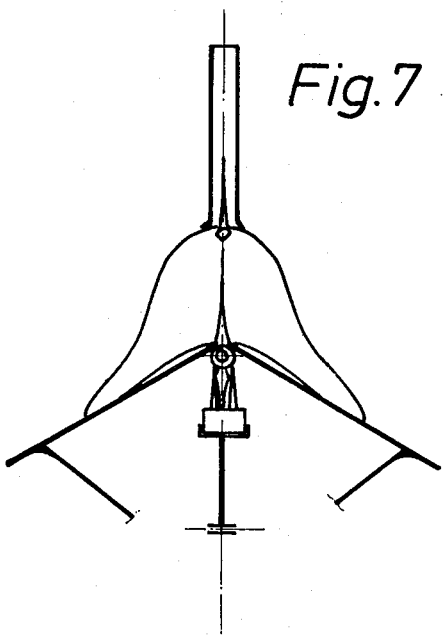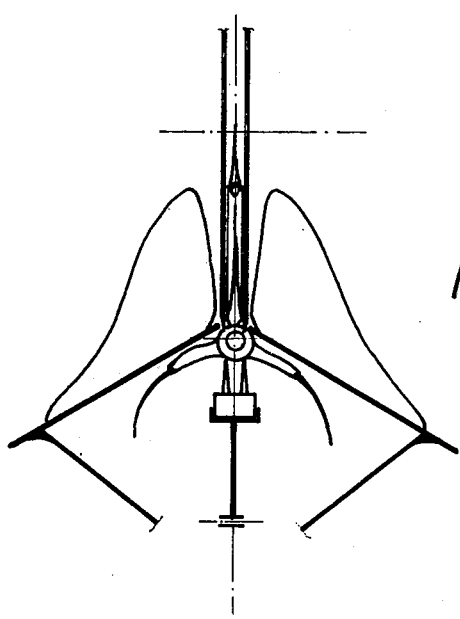

PROCESS AND APPARATUS FOR FILLETING FISH

BACKGROUND OF THE INVENTION

This invention relates to a method and apparatus for filleting fish by cutting into the fishes on both sides of the belly spines.

In methods of this kind, it is essential that the operation of cutting fillets from their ribs and/or lateral vertebral appendages is confined to the belly cavity zone. In known methods of filleting, the through-put rate of the fishes per unit of time is either low, if the starting time of the rib knives is to be controlled in a simple manner — for example when using a saddle that supports the fish in its belly cavity — or the expenditure for measuring and control means is very high if methods are used in which fishes are not conveyed in a fixed cycle.

SUMMARY OF THE INVENTION

The object of the invention is to fillet fishes at a high through-put rate with accurate control of the commencement time at which the tools are cut free flesh from the ribs and/or lateral vertebral appendages using as simple tools as possible.

According to one aspect of the present invention, a method of filleting fish includes making a pair of incisions one on each side of the belly spines thus separating the flesh from the belly spines and thereafter sensing the presence and/or absence of the belly spines in order to time the commencement and/or completion of a filleting operation in the belly cavity region.

Preferably, a strip containing the belly spines is severed to the same depth below the vertebrae prior to the sensing operation.

According to another aspect of the present invention, a machine for filleting fish comprises a pair of belly knives for separating the belly spines between the belly cavity and the tail, a pair of rib knives, and a sensing element adapted to control at least part of the operation of the rib knives by sensing the presence and/or absence of the belly spines. A pair of spaced guides for the belly spines may be provided which are positioned below the belly knives and the rib knives, the spaced guides having an opening through which a bone knife can pass to sever the lower parts of the belly spines, the sensing element being positioned a fixed distance below the top of the guides but above the level of the operational edge of the bone knife.

Preferably, the sensing element is mounted for pivotal movement upwardly against a spring force. The pivotal movement may be about an axis extending parallel to the spaced guides. The sensing element may be supported by leaf springs. The rib knives may co-operate with a pair of guide flaps disposed upstream thereof and the sensing element controls movement of the guide flaps.

The sensing element preferably co-operates with a memory element which controls the guide flaps.

DESCRIPTION OF THE PREFERRED EMBODIMENT

Figure 1:
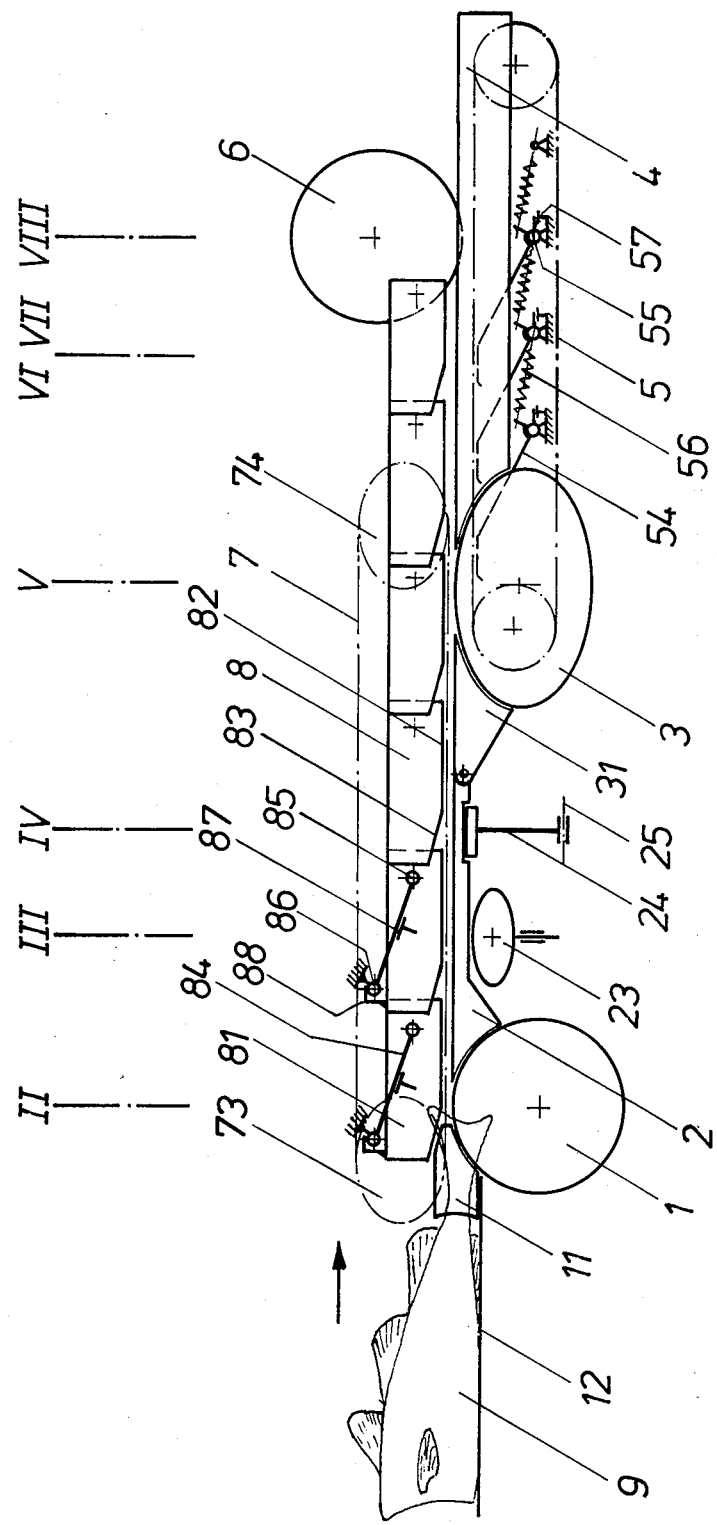

The invention may be carried into practice in various ways but one specific embodiment will now be described by way of example, with reference to the accompanying diagrammatic drawings, in which:

FIG. 1 is a side elevation of a filleting machine, according to the invention; and FIGS. 2–8 are sectional side elevations taken on the lines II–VIII respectively in FIG. 1.

FIG. 1 illustrates a filleting machine which includes a pair of circular belly spine knives 1 arranged vertically and parallel to one another, a pair of inclined rib knives 3 and a pair of vertical, parallel, back knives 6. All the knives are rotatably supported in fixed bearings in a machine frame and are driven in well known manner. Whilst the rib knives 3, as shown in FIG. 5, are inclined to each other at an angle of approximately 120°, other orientations are possible. Positioned downstream of the belly spine knives 1 are a pair of guide strips, bars or rails, hereafter called strips 2 which have vertically spaced faces, as shown in FIG. 3, to enclose a gap 22 between them which extends towards the rib knives 3 and to a pair of adjustable guide flaps 31 disposed downstream of the guides 2 and the operation of which will be described. In the region of FIG. 3 and FIG. 4, the guide strips 2 also have horizontal surfaces for guiding parts of the fish as shown. These horizontal vertical surfaces meet at a rib 21 which is employed to support the backbone of the fish.

Positioned at the forward end of the guide strips 2 is a single bone knife 23, shown in FIG. 3, which comprises a circular knife adapted to pass either below the guide strips 2 or through a slit formed in the side wall of one or both strips. A pair of bone knives inclined to one another can, alternatively, be used. The bone knives are biased to a position in which they cut the belly spines which are guided in the gap 22 between the guide strips 2. As shown by the arrows in FIG. 3, the bone knife 23 is pivotally mounted for arcuate movement between operative and inoperative positions. It is so disposed that it cuts at a distance of 15–20 millimeters below the top edges of the guide strips 2.

Positioned downstream of the bone knife 23 is a feeler or sensor 24 which extends into a gap between the two guide strips 2. If necessary, one guide strip may be provided with an aperture to receive the feeler 24 as shown in FIG. 4. The feeler is mounted on an arm pivoted at 25 for arcuate movement in the direction of the arrows shown in FIG. 4. The guide flaps 31, which have already been referred to, merge at their forward ends with the contour of the rib knives 3 and are adapted to be raised or lowered, in a manner known in the art, to control the timing of the cuts of the rib knives on the fish. The timing of the movement of the guide flaps 31 is controlled by means of suitable electronic or mechanical interconnecting means between the guide flaps 31 and the sensor 24 which may include a memory device.

Downstream of the rib knives 3 are a pair of guides generally indicated at 4 in FIG. 1, which merge their upstream ends with the contour of the knives 3 and which extend to and beyond the underside of the back knives 6. As shown in FIG. 6, the guides 4 comprise a pair of guide plates 41 disposed approximately in the inclined planes of the rib knives 3 and each being pivotable about axes 42 lying parallel to one another and being coupled by synchronising means 43. The guides 41 are held by a spring 44 against a stop abutment, not shown, so that a gap 45 enclosed by their top edges is sufficient for admitting the backbones of the smallest fish.

Referring to FIGS. 1 and 5, disposed between the rib knives 3 and the back knives 6 and at a level below the guides 4 is an endless conveyor 5 comprising a chain 51 carrying two spaced rows of spikes 52. The chain 51 is supported by a plurality of pressure rails 53 which are pivotable about an axis 55 and which are held by springs 56 (see FIG. 1) against stop abutments 57 that are fixed with respect to the frame so that the spikes 52 pass closely under the gap 45 between the guides 41.

On its upper side, the machine includes a series of overlapping pairs of guides 81 whose adjacent ends overlap one another in the direction opposite to the conveying direction of the fish. This series of guides forms a back guide 8 above the path of the fish and which extends from above the belly knives 1 to a position adjacent the back knives 6. Each of the pairs of guides encloses a slit 89 (see FIG. 4) and is supported on the free end 85 of a radius arm 84 which is pivotable about an axis 86 fixed to the frame and is supported by means of a stop abutment 88 adjacent the axis 86. The downward movement of the radius arm 84 is limited by a stop abutment 87 which is fixed with respect to the machine frame. The bottom edge 82 of each pair of guides extends parallel to the top edge of the guide strips 2. On the inlet side of each pair of guides there are run-up surfaces 83 which may in turn be provided with V-shaped edges. In the interest of simplicity, the radius arms and stop abutments are only shown for the first two pairs of guides.

Referring to FIGS. 1, 3 and 4 a belly conveyor 7 comprises a pair of conveyor belts 71 mounted one adjacent each flank of the fish. The conveyor extends from above the belly knives to above the rib knives 3. The conveyor belts 71 are provided with spikes 72 and are adapted to move in inclined planes which are symmetrically disposed to one another and which are deflected synchronously in relation to one another to accommodate different sizes of fish. They are positioned so that their spikes 72 point into the space which is left free between the top edges of the strips 2 and the bottom edges of the pairs of guides 81.

The method of operation is as follows. A beheaded fish 9 (see FIG. 1) whose belly cavity has been cleaned, is pushed, for example through a V-shaped trough 12, up to the belly spine knives 1 in front of which it is accurately aligned by an inlet 11 and is then gripped and conveyed by the spikes on the conveyor belts 71. As a consequence, the fish is moved to the right in FIG. 1 and, as a consequence, the belly spine knives 1 cut into the flesh from the root of the tail up to the belly cavity on each side of the belly spines which depend from the backbone in this region. The cuts made by the knives 1 extend up to the backbone. Thereafter, the backbone is supported by the rib 21 of the guides 2 whilst the belly spines are guided between the vertical faces of the guide strips 2, i.e. in the gap 22. This also receives the lower part of the tail fin. Whilst advancing on these guide strips, the belly spines are cut by the bone knive 23 to the same depth below the vertebrae 92. The remaining strip 97 (see FIG. 4) is sensed by the sensor 24 during the further course of the feeding motion. When the strip 97 ceases to deflect the sensor 24 during the commencement of the passage of the belly cavity, the sensor will supply a pulse to a mechanical or electronic mechanism which will cause the guide flaps 31 to be lowered in front of the rib knives 3, with an appropriate delay, so that the said rib knives are able to cut free the ribs 91 and the vertebral appendages 93 shown in FIG. 5. Thereafter, the guide plates 41 penetrate into the cuts made by the rib knives 3 and these guide plates centre the backbone 94 between them and support the vertebrae 92 of the backbone whilst the spikes 52 of the chain 51 engage the bones from below under the action of the springs 56 and convey the fish to the back knives 6. At this time, the fish is still guided by the guide plates 81.

Simultaneously with the run-in of the lower tail fin half between the knives 1, the upper tail fin half runs into the gap 89 between the first pair of guides 82 and said guides thus are lifted upwards by the back of the fish during the further conveyor movement while on further advance of the fish the guide is lowered again in guiding the back fins. At the same time, it guides the top tail fin half and the dorsal fins into the gap 89 of the next pair of guides 81 and these pairs of guide plates adapt themselves to the different height and length of the back of the fish. In this way, the fish is constantly guided by its back whilst passing the knives until the last pair of guides 81 guide the fins between the back knives 6.

By virtue of this arrangement, uninterrupted guiding of the back with a consequent adaptation of the guides to the individual shape of the fish permits the knives to be adjusted to obtain a degree of economy and flesh severance which is not otherwise obtainable. This is particularly applicable to a method in which the fish are fed tail-leading, and enables accurate guiding and excellent flesh yield to be obtained with a high speed of operation and a consequent high throughput rate.

By severing the belly-spines the fish can be reliably guided. Moreover the conveying of the fish by action on the vertebrae using a deflectable conveyor is also facilitated.

The various novel integers described make it possible to vary the specific construction very readily for processing different sizes of fish.

Any kind of transmission and memory or storage mechanism may be provided for operating the guide flaps 31 and the rib knives 3 from the sensor 24. The use of memory mechanism enables further different tools to be controlled at different distances from the single sensor, and at different times within the machine.

What we claim as our invention and desire to secure by Letters Patent is:

1. A method of filleting fish comprising the steps of transporting a fish with its tail leading along a conveyor, making a pair of incisions one on each side of the belly spines thus separating the flesh from the belly spines, said incisions extending from the tail to the belly cavity of the fish to expose the belly spines which depend from the backbone of the fish, guiding the fish along said conveyor by means of said exposed belly spines, and thereafter sensing the passage of said exposed belly spines past a pre-selected point on said conveyor in order to time the commencement and/or completion of a filleting operation and to confine said filleting operation to the belly cavity region.

2. A method as claimed in claim 1 in which a strip containing the belly spines is severed to a uniform depth below the vertebrae of said fish prior to the sensing operation, and thereafter guiding the fish along said conveyor by means of said severed strip.

3. A machine for filleting fish comprising means for transporting fish successively past a plurality of processing stations for performing an automatic filleting operation, a pair of belly knives at one of said stations for separating the belly spines from the flesh between the belly cavity and the tail of said fish, thereby exposing said belly spines, a pair of rib knives at a subsequent station, and a sensing element adapted to control at least part of the operation of the rib knives by sensing the presence and/or absence of the exposed belly spines as the fish are transported past said sensing element, to confine operation of said rib knives to the belly cavity region of the fish.

4. A machine as claimed in claim 3 including a pair of spaced guides for the belly spines positioned between the belly knives and the rib knives, the spaced guides having an opening through which a bone knife can pass to sever the lower parts of the belly spines, the sensing element being positioned a fixed distance below the top of the guides but above the level of the operational edge of the bone knife.

5. A machine as claimed in claim 4 in which the sensing element is mounted for pivotal movement outwardly against a spring force.

6. A machine as claimed in claim 5 in which the sensing element is pivotable about an axis extending parallel to the spaced guides.

7. A machine as claimed in claim 5 in which the sensing element is supported by leaf springs.

* * * * *